(No Model.) 2 Sheets—Sheet 1.
W. H. ATKINSON.
FISHING REEL.
No. 463,377. Patented Nov. 17, 1891.
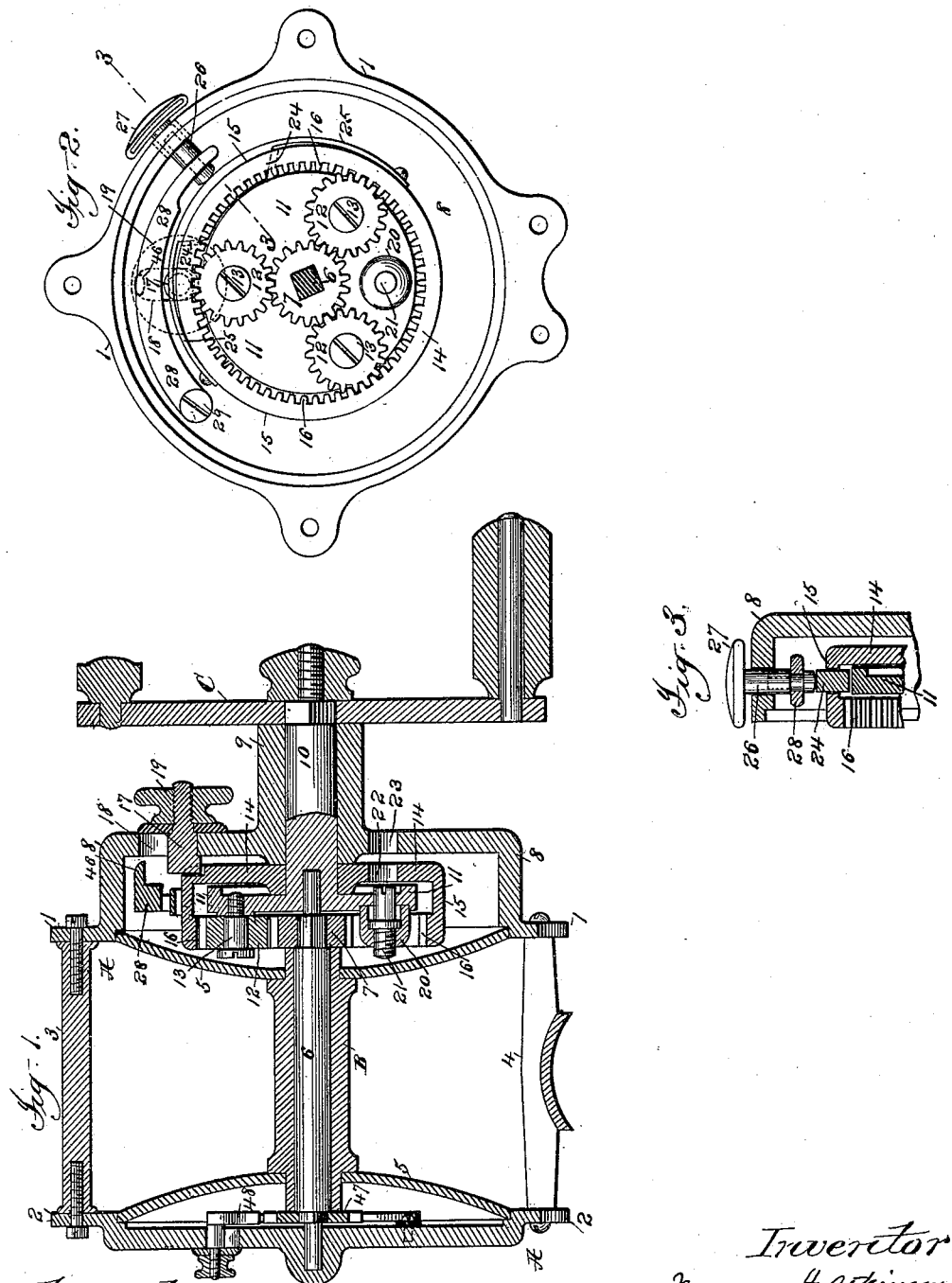
Attest
Geo H Potts
T. F. Kehoe
Inventor:
William H Atkinson
by Philipp Philipp & Huey
Attys

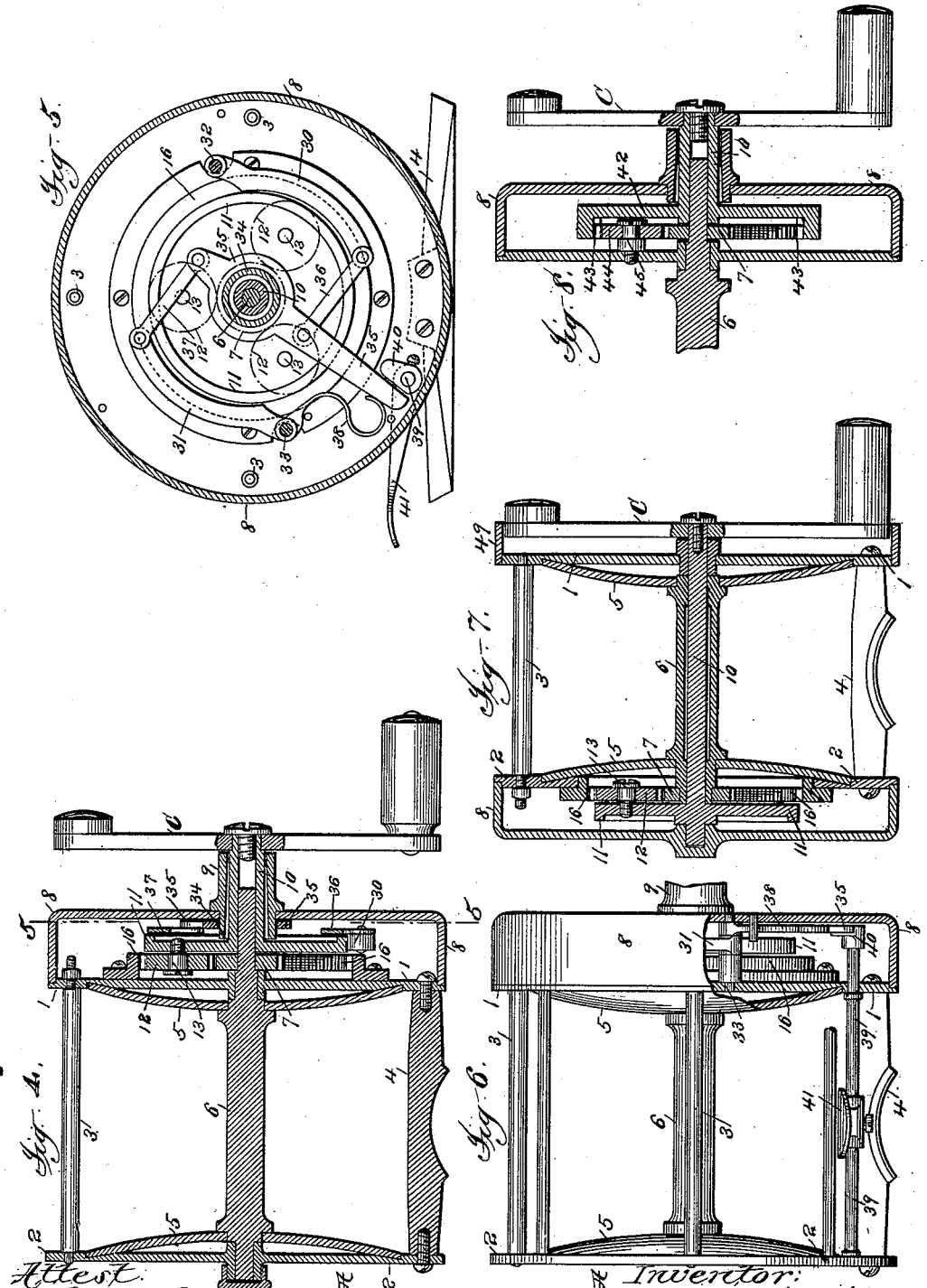

UNITED STATES PATENT OFFICE.

WILLIAM H. ATKINSON, OF BROOKLYN, NEW YORK.

FISHING-REEL.

SPECIFICATION forming part of Letters Patent No. 463,377, dated November 17, 1891.

Application filed June 9, 1890. Serial No. 354,764. (No model.)

*To all whom it may concern:*

Be it known that I, WILLIAM H. ATKINSON, a citizen of the United States, residing at Brooklyn, county of Kings, and State of New York, have invented certain new and useful Improvements in Fishing-Reels, fully described and represented in the following specification and the accompanying drawings, forming a part of the same.

This invention relates to fishing-reels, and particularly to that class known as "multiplying-reels," one of its objects being to provide a reel of this class in which a higher degree of multiplication shall be obtained than in reels heretofore in use, and to provide a simple, compact, and convenient arrangement of gears to which the power shall be applied centrally to the reel.

The further objects of my invention are to provide a reel which may conveniently and quickly be changed from a multiplying to a single-action reel, to provide an improved brake, and to improve the general construction of fishing-reels of all classes.

With these objects in view my invention consists in various constructions and combinations of parts, all of which will be more particularly described in the specification and pointed out in the claims.

For a full understanding of my invention a detailed description of a reel embodying the same will now be given, reference being had to the accompanying drawings, in which—

Figure 1 is a central longitudinal section of the preferred form of reel embodying my invention. Fig. 2 is a sectional elevation of the same, taken inside of the cap-plate, showing the multiplying-gears and brake. Fig. 3 is a detail section on the line 3 3 of Fig. 2. Fig. 4 is a central longitudinal section of a modified form of reel. Fig. 5 is a section on the line 5 5 of Fig. 3. Fig. 6 is a side elevation of the reel shown in Figs. 4 and 5, part of the cap-plate being broken away. Figs. 7 and 8 are central longitudinal sections showing further modifications.

Referring now especially to Figs. 1, 2, and 3, the reel-frame A is formed of a pair of plates 1 2, connected by cross-bars 3, and having the base-piece 4 for attachment to the rod. Within this frame is mounted the spool B, having the usual convex end pieces 5, and the shaft 6, with which it rotates, the latter being provided with the gear 7, by which it is driven. The usual head-plate of the reel-frame is omitted, and the plate 1, to which the cross-bars 3 and base-piece 4 are secured and which corresponds to the rim of the usual head-plate, is provided with an outward extension 8, preferably formed integral therewith, as shown, which constitutes the usual cap. This cap is provided with an outward extension 9, within which is mounted the shaft 10, to which is secured the crank C, by which the spool is rotated. This shaft 10 is provided at its end within the cap with a disk 11, on which is or are mounted to rotate one or more gears 12, these gears being preferably mounted upon the disk by means of screw-studs 13, as shown. The shaft 10 is also recessed at its inner end to receive the end of the spool-shaft 6, thus forming a support and bearing therefor. The disk 11 is provided with an extended face upon which the brake is adapted to operate, as will presently be described. In case a brake is not to be used or is to be applied to some other part one or more arms may be substituted for the disk, such construction being obviously the equivalent of that shown.

Mounted loosely upon the shaft 10 between the cap 8 and disk 11 is a disk 14, provided with a flange 15, extending inward over and outside the disk 11 and gears 12. The interior of this flange opposite the gears 12 is provided with a series of teeth, thus forming an interior gear 16, engaging the gears 12. For the purpose of holding the disk 14 and the interior gear in a fixed position during the operation of the crank C the outer side of the disk is provided with a recess or slot engaged by a slide 17, mounted in a slot 18 in the cap, this slide 17 being provided with a locking thumb-nut 19 by which it may be secured either in its inner position in the slot in which the disk and gear are locked in a fixed position or in its outer position, in which the disk and gear are free to rotate. For the purpose of locking the disks 14 and 11 together, so that the gear 16 will rotate with the shaft 10 and gears 12 when the reel is to be used as a single-action reel, the disk 11 carries a projection 20, in which is mounted a screw-stud 21, and the disk 14 is provided with an opening 22 opposite the stud 21, into which the latter may be withdrawn by a screw-driver inserted through an opening 23 in the cap, thus locking the disks together.

A part of the flange 15 is cut away opposite the disk 11 and a brake-piece 24 is mounted on spring-arms 25, so as to be forced inward through the opening in the flange 15 to engage the disk 11, the springs 25 normally holding the brake-piece 24 out of engagement with the disk. A stud 26, sliding in an opening in the rim of the cap 8 and provided with a thumb-piece 27, engages the brake-piece 24 for applying the brake. This stud 26 is supported inside the frame by an arm 28, pivoted on the inside of the cap-plate at 29, as shown in Fig. 2. The arm 28 has a lug 46 projecting into the path of the slide 17, so that the arm and thumb-piece are moved into and held in a raised position when the slide is shifted to unlock the gear 16. At the opposite end of the reel are the click-wheel 47 and click 48 for use when a single-action click-reel is desired, the parts being shown as of a common construction.

The operation of the reel will now be described: If a multiplying-reel be desired, the parts will be adjusted, as shown in Fig. 1, the interior gear 16 being locked against movement and the stud 21 being forced inward to disengage the two disks 11 14. The rotation of the crank-arm C through the shaft 10 carries with it the disk 11 and gears 12, the gears 12 thus having a movement of rotation from their engagement with the fixed interior gear 16 and a movement of translation about the shaft 6 in a circle, the radius of which is the distance between the centers of the gears 12 and shaft 6. By this construction a multiplication is secured independent of the relative sizes of the gears employed, this multiplication resulting from the movement of translation of the gear or gears 12 about the interior gear 16. By this arrangement of gears I am able to obtain within a very small compass and without employing gears of large size a degree of multiplication in excess of that employed in fishing-reels as heretofore constructed, and it will be seen that the construction is exceedingly simple, compact, and convenient in use. It will be seen, also, that the power being applied centrally to the reel and operating-shaft the sidewise strain upon the parts resulting from the location of the crank-shaft in multiplying-reels to one side of the center of the reel is avoided. By dispensing with the usual head-plate and locating the crank-shaft and gears centrally to the reel I economize space, enabling the gears to be located close within the concavities of the end pieces 13, thus reducing the length of the reel.

When a single-action reel is desired, the slide 17 is moved into and locked in its outer position, thus releasing the disk 14 and interior gear 16, and the disks 11 and 14 will be locked together by the retraction of the screw 21, the gears 16 and 12 then revolving together about the shaft 6 and operating as a single gear upon the gear 7 of the spool-shaft. It will be seen that this affords a convenient and speedy method of changing from a multiplying-reel to a single-action reel when desired.

When the reel is used as a multiplying-reel, the brake-piece 24 will act as a check upon the rotation of the spool by being forced into engagement with the rim of the disk 11 by means of the stud 26. When the slide 17 is shifted for changing to a single-action reel, the slide engages the lug 46 and the arm 28 and stud 26 are moved outward, so that the brake is inoperative. The click 48 may then be moved into operative position, as usual in click-reels.

In Figs. 4, 5, and 6 is shown a modification in which the plate 1 extends across the face of the reel and forms the usual head-plate, the cap 8 being secured to the rim of the head-plate, as is common in this class of construction. In the reel shown in these figures the interior gear 16 is permanently secured to the outer side of the head-plate, the reel being designed to be used only as a multiplying-reel, the operation of the gears being the same as in the reel already described. The spool-shaft 6 is mounted in and supported by the head-plate, and its end is extended outward and forms a bearing for crank-shaft 10, which is made hollow and mounted upon it. The outer extension 9 of the cap-plate then forms a casing which acts as a guard to prevent any undue strain upon the bearing of the crank-shaft. I thus secure a smaller bearing than could be otherwise obtained and at the same time avoid any unevenness of movement. I have shown in these figures an improved form of brake which I prefer to use with this construction of a non-changeable multplying-reel, and which is of general application in reels of all constructions, whether multiplying or single-action reels. This brake consists of two brake-pieces 30 31 upon opposite sides of the disk 11, these brake-pieces being pivoted upon the inside of the cap-plate at 32 and 33, respectively. In this construction the part 9 forming the guard for the shaft 10 is extended inside the cap and forms a bearing 34 for an arm 35, extending across the center of the reel and having pivotally connected thereto on opposite sides of its bearing 34 links 36 37, the other ends of which are pivotally connected to their respective brake-pieces 30 31. The spring 38 presses against the outer end of the arm 35, thus normally holding the brake-pieces 30 31 out of engagement with the disk 11.

For the purpose of applying the brake the shaft 39 is pivotally mounted in the head and tail plate of the reel, and is provided inside the cap with a crank-arm 40, which engages the arm 35 upon the side opposite the spring. This shaft 39 is provided with a thumb-piece 41, placed centrally to the reel and adjacent to the base-piece 4, in convenient location for application by pressure of the thumb. It will readily be seen that the movement of the shaft 39 and crank-arm 40 moves the arm against the tension of the spring 38, so as to carry the brake-pieces 30 31 into engagement with the disk 11, and that upon releasing the thumb-piece 41 the spring 38 returns the arm 35 to its normal position, releasing the brake.

In the constructions thus far described the operating-gears are placed at the head of the reel; but this is not necessary.

I have shown in Fig. 7 a construction in which the operating-gears are placed at the opposite end of the reel. In this construction the spool-shaft is hollow, and the shaft 10, to which the crank-arm C is attached, is extended through the spool-shaft and pivoted in the head-plate 1 and the cap-plate 8, which is now placed at the tail end of the reel. The shaft 10 thus forms a bearing for the hollow shaft 6. The tail-plate common in this class of construction is omitted and the fixed gear 16 is secured to the outer rim of the plate 2, to which the cross-bars 3 are secured, the cap 8 either being formed integral with the plate 2, as in the construction of the head-cap shown in Fig. 1, or being connected thereto, as shown in Fig. 7. The shaft 10 carries outside the gear 7 and between it and the cap 8 a disk 11, provided with one or more gears 12, as in the constructions previously described, and the general operation of the parts is the same, any form of brake being employed, preferably the form shown in Figs. 4 to 6, the construction being the same, except that the brake is carried at the other end of the reel.

It will be seen that the construction shown in Fig. 7 is very simple and compact, so that the length of the reel is greatly lessened, while a firm support is provided for the shafts 6 and 10; and I am able to make a protected handle by extending over the crank the flanges 49 of the head-plate, the crank being mounted close to the latter.

In Fig. 8 I have shown a construction embodying some of the features of my invention, but omitting the special feature of the movement of translation of the operating-gears. In this construction the head-plate is used and the shafts 6 and 10 are mounted as in the construction shown in Fig. 4. The shaft 10, however, in this case carries a disk 42, provided with a flange forming an interior gear-wheel 43, and one or more intermediate gears 44 are pivotally mounted in a fixed position by screws 45, secured in the head-plate. The interior gear 43 is thus carried by the shaft 10, and the degree of multiplication depends entirely upon the relative sizes of the interior gear 43, the intermediates 44, and the spool-shaft gear 7. It will be seen, however, that in this construction, as in the others previously described, the power is applied centrally to the reel, and by the use of the interior gear a less number of gears is employed and a more compact arrangement of the gears secured.

While I have shown three intermediate gears in each of the reels, and I prefer to use a plurality of such gears for the purpose of securing a more uniform action and providing a resistance to any sidewise strain upon the shafts, it will be understood that the same degree of multiplication and the same general operation of the reel will be secured by the use of a single intermediate gear, so that the number of gears necessarily employed in my multiplying-reel is reduced to three, and in the construction shown in Figs. 1 to 7 but two movable gears are used. Consequently the number of bearings subject to wear and requiring to be oiled is correspondingly reduced.

It is evident that the construction shown and described may be varied widely by one skilled in the art, while retaining the essential features of my invention.

What I claim is—

1. In a fishing-reel, the combination, with the spool-shaft and its gear, of an interior gear, a crank and crank-shaft, one or more driving-gears carried by the crank-shaft and having movements of rotation on and revolution with the crank-shaft, said driving-gears being mounted between and engaging the spool-shaft gear and interior gear, means for locking the interior gear in a fixed position, and means for locking the interior gear to the crank-shaft, substantially as described.

2. In a fishing-reel, the combination, with the spool-shaft and its gear, of a stationary interior gear, a crank and crank-shaft, a disk carried by the crank-shaft, one or more driving-gears mounted on said disk to rotate thereon and be carried thereby, said gears being mounted between and engaging the spool-shaft gear and interior gear, and a brake arranged to be applied to the disk, substantially as described.

3. The combination, with the spool B and its shaft and gear, of the reel-frame A, having the cap 8, the crank-shaft 10, mounted centrally in said cap and forming a bearing for said spool-shaft, interior gear 16, loosely mounted on said crank-shaft, one or more driving-gears 12, carried by the crank-shaft and having movements of rotation on and revolution with the crank-shaft, said driving-gears being mounted between and engaging the spool-shaft gear and interior gear, means for locking the gear 16 to the frame, and means for locking the same to the crank-shaft, substantially as described.

4. The combination, with the shaft 6 and gear 7, of the stationary interior gear 16, and shaft 10, carrying one or more gears 12, having movements of rotation on and revolution with said shaft, said gears 12 being mounted between and engaging gears 7 and 16, substantially as described.

5. In a fishing-reel, the combination, with the spool and spool-shaft, of a reel-frame having a cap forming the end plate at one end of the frame, a crank-shaft mounted centrally to the reel and forming a bearing for said spool-shaft, and a series of gears placed inside the cap and between the cap and spool end for transmitting the movement of the crank-shaft to the spool, substantially as described.

6. In a fishing-reel, the combination of a spool-shaft extended outside its bearings, a crank-shaft mounted on said extended spool-shaft, a series of gears between said shafts, and a cap provided with a sleeve through which the crank-shaft extends and which forms a guard for the crank-shaft, substantially as described.

7. In a fishing-reel, the combination, with a rotating shaft, of reversely-arranged pivoted brake-pieces adapted to engage said shaft, a lever oscillating concentrically with said shaft, and links connecting said brake-pieces to the lever on opposite sides of its fulcrum, substantially as described.

8. The combination of the pivoted brake-pieces 30 31, lever 35, links 36 37, connecting said brake-pieces to the lever on opposite sides of its fulcrum, means for operating the lever in one direction, and a spring for returning the lever and brake-pieces to their normal position, substantially as described.

In testimony whereof I have hereunto set my hand in the presence of two subscribing witnesses.

WILLIAM H. ATKINSON.

Witnesses:
T. H. PALMER,
T. F. KEHOE.